(12) United States Patent
Kawanami et al.

(10) Patent No.: US 11,249,185 B2
(45) Date of Patent: Feb. 15, 2022

(54) SIGNAL PROCESSING DEVICE AND RADAR APPARATUS

(71) Applicant: FURUNO Electric Co., Ltd., Hyogo (JP)

(72) Inventors: Satoshi Kawanami, Hyogo (JP); Atsushi Uodome, Hyogo (JP); Kensuke Iseri, Hyogo (JP); Ryosuke Morigaki, Hyogo (JP); Yuya Yakiyama, Hyogo (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 393 days.

(21) Appl. No.: 16/157,468

(22) Filed: Oct. 11, 2018

(65) Prior Publication Data

US 2019/0072670 A1 Mar. 7, 2019

Related U.S. Application Data

(63) Continuation of application No. PCT/JP2017/009495, filed on Mar. 9, 2017.

(30) Foreign Application Priority Data

Apr. 11, 2016 (JP) .............................. JP2016-079172

(51) Int. Cl.
*G01S 13/95* (2006.01)
*G01C 13/00* (2006.01)
(Continued)

(52) U.S. Cl.
CPC ............ *G01S 13/956* (2013.01); *G01C 13/00* (2013.01); *G01S 7/295* (2013.01); *G01S 7/41* (2013.01); *G01S 13/95* (2013.01); *Y02A 90/10* (2018.01)

(58) Field of Classification Search
CPC ........ G01S 13/956; G01S 13/95; G01S 7/411; G01S 7/2926; G01S 7/414; G01S 7/415;
(Continued)

(56) References Cited

U.S. PATENT DOCUMENTS 5,594,451 A * 1/1997 Krikorian ............... G01S 7/414
342/160
8,305,257 B2 11/2012 Trizna
(Continued)

FOREIGN PATENT DOCUMENTS

CN 103558600 A 2/2014
JP 1991-262990 A 11/1991
(Continued)

OTHER PUBLICATIONS

Extended European Search Report dated Nov. 7, 2019 in European Application No. 177821618-1206.
(Continued)

*Primary Examiner* — Olumide Ajibade Akonai
(74) *Attorney, Agent, or Firm* — Xsensus LLP

(57) ABSTRACT

The purpose is to calculate wave information accurately. A signal processing device 10 is provided, which may include a frequency area spectrum generating module 8, an integrating module 17, and a wave information calculating module 18. The frequency area spectrum generating module 8 may carry out a frequency analysis of the echoes from the waves included in a plurality of analysis areas set within the detection area, respectively, and generate frequency area spectrums for the plurality of analysis areas, respectively. The integrating module 17 may integrate echo intensities indicated by each sampling point that constitutes each of the frequency area spectrums while unifying directions included in coordinates of the frequency area spectrum, and generate an integrated frequency area spectrum. The wave informa- (Continued)

tion calculating module 18 may calculate wave information that is information related to the waves included in the analysis areas based on the integrated frequency area spectrum, respectively.

14 Claims, 10 Drawing Sheets

(51) Int. Cl.
*G01S 7/295* (2006.01)
*G01S 7/41* (2006.01)

(58) Field of Classification Search
CPC .......... G01S 7/295; G01S 7/41; G01S 13/931; G01S 13/42; G01S 13/584; G01S 13/582; G01S 13/726; G01S 13/88; G01S 2013/93271; G01S 13/02; G01S 7/356; G01S 7/354; G01S 13/34; G01S 7/2883; G01C 13/00; Y02A 90/10
See application file for complete search history.

(56) References Cited

U.S. PATENT DOCUMENTS

| | | | |
|---|---|---|---|
| 9,557,407 B1* | 1/2017 | Rezk | H04B 1/123 |
| 2002/0005798 A1* | 1/2002 | Wada | G01S 13/951 |
| | | | 342/26 R |
| 2003/0179084 A1* | 9/2003 | Skrbina | G01S 13/867 |
| | | | 340/435 |
| 2015/0333783 A1* | 11/2015 | Abe | H04B 1/123 |
| | | | 375/285 |
| 2015/0355319 A1* | 12/2015 | Roger | G01S 13/343 |
| | | | 342/147 |
| 2016/0349363 A1* | 12/2016 | Millar | G01S 13/931 |
| 2017/0153316 A1* | 6/2017 | Wintermantel | G01S 7/2923 |
| 2017/0254882 A1* | 9/2017 | Malik | G01S 13/726 |

FOREIGN PATENT DOCUMENTS

| | | |
|---|---|---|
| JP | 2005-43333 A | 2/2005 |
| JP | 2011-33529 A | 2/2011 |
| JP | 2014/192528 A1 | 12/2014 |
| JP | 2014-235049 A | 12/2014 |
| JP | 2015-14472 A | 1/2015 |
| JP | 2015-180858 A | 10/2015 |
| WO | 92/21041 | 11/1992 |
| WO | 2014/192528 | 12/2014 |

OTHER PUBLICATIONS

English Translation of International Search Report and Written Opinion for International Application No. PCT/JP2017/009495, dated May 30, 2017.

* cited by examiner

SIGNAL PROCESSING DEVICE AND RADAR APPARATUS

CROSS-REFERENCE TO RELATED APPLICATION(S)

This application claims priority to PCT Application No. PCT/JP2017/009495, filed Mar. 9, 2017 which claims the benefit of Japanese Application No. Tokugan2016-079172, filed Apr. 11, 2016. The entire contents of the above-identified applications are hereby incorporated by reference herein.

TECHNICAL FIELD

The present disclosure relates to a signal processing device which calculates wave information (such as a surface wave on a body of water), including wave height, by processing an echo from a wave, and a radar apparatus provided with the signal processing device.

BACKGROUND

Conventionally, as apparatuses which acquire wave information as information related to a wave, wave observation radars (radar apparatus) as disclosed in Patent Document 1 are known. In such a radar apparatus, with reference to FIG. 2 of Patent Document 1, echo signals acquired from echoes from a given range on the sea are two-dimensionally fast Fourier transformed (FFT), and with reference to FIG. 3 of Patent Document 1, a two-dimensional Fourier transformed signal Sf is derived. Then, the radar apparatus calculates wave information (a wave direction, a wavelength, etc.) based on the two-dimensional Fourier transformed signal Sf.

REFERENCE DOCUMENT OF CONVENTIONAL ART

Patent Document

[Patent Document 1] JP1991-262990A

DETAILED DESCRIPTION

Meanwhile, when calculating the wave information as described above, the wave information may not be calculated accurately.

The present disclosure is to solve the problem, and one purpose thereof is to calculate the wave information accurately.

SUMMARY (1) In order to solve the problems described above, according to one aspect of the present disclosure, a signal processing device configured to process echoes from waves included in a detection area is provided, which may include a frequency area spectrum generating module (processing circuitry), an integrating module (processing circuitry), and a wave information calculating module (processing circuitry). The frequency area spectrum generating module may carry out a frequency analysis of the echoes from the waves included in a plurality of analysis areas set within the detection area, respectively, and generate frequency area spectrums for the plurality of analysis areas, respectively. The integrating module may integrate echo intensities indicated by each sampling point that constitutes each of the frequency area spectrums while unifying directions included in coordinates of the frequency area spectrum, and generate an integrated frequency area spectrum. The wave information calculating module may calculate wave information that is information related to the waves included in the analysis areas based on the integrated frequency area spectrum, respectively.

While the terms "module" (e.g., integrating module), "part" (e.g., receiving part), or "unit" (e.g., display unit) may be used in the present document, it should be understood that these terms are used to describe a structure (e.g., processing circuitry that may be hardwired, or configured by software that is executed by the circuitry; a receiver; or a display).

(2) The integrating module may integrate the frequency area spectrums obtained by multiplying the echo intensities at the sampling points by weight coefficients determined for the plurality of frequency area spectrums, respectively.

(3) A value of the weight coefficient may be determined based on an unnecessary target object that is a target object other than the wave included in the analysis area.

(4) The weight coefficient by which the echo intensity at each of the sampling points of the frequency area spectrum obtained from the analysis area where the unnecessary target object is included among the plurality of analysis areas is multiplied may be zero.

(5) The unnecessary target object may be at least one of a ship, land, rain, and snow.

(6) The weight coefficient may be determined based on the echo intensity of the wave included in each of the analysis areas.

(7) The frequency area spectrum generating module may have a wave component extracting module configured to extract a wave component resulting from the wave from the echo obtained from each of the plurality of analysis areas, the frequency area spectrum generating module carrying out a frequency analysis of the wave component to generate the frequency area spectrum.

(8) According to another aspect of the present disclosure, a radar apparatus is provided, which may include a transmitter, a receiver, and the signal processing device of any one of described above. The transmitter may transmit a transmission wave. The receiver may receive an echo obtained by the transmission wave transmitted from the transmitter being reflected on a wave and coming back. The signal processing device may process the echo received by the receiver.

(9) The radar apparatus may further include an unnecessary target object detecting module configured to detect an unnecessary target object that is a target object other than the wave, based on the echo received by the receiver.

(10) According to another aspect of the present disclosure, a signal processing device is configured to process echoes of radar pulses from waves on a body of water included in a detection area, including:

processing circuitry configured to perform a frequency analysis of the echoes from the waves included in a plurality of analysis areas within the detection area, respectively, and generate frequency area spectrums for the plurality of analysis areas, respectively;

integrate echo intensity indicated by each sampling point that constitutes each of the frequency area spectrums while unifying directions included in coordinates of the frequency area spectrums, and generate an integrated frequency area spectrum; and detect a physical property of the waves included in the analysis area via calculation of wave information that is information related to the physical property of the waves based on the integrated frequency area spectrum, respectively.

(11) According to another aspect of the present disclosure, a method implemented with processing circuitry of processing echoes of radar pulses from waves on a body of water included in a detection area, the method including:

performing a frequency analysis of the echoes from the waves included in a plurality of analysis areas within the detection area, respectively, and generating frequency area spectrums for the plurality of analysis areas, respectively, integrating echo intensity indicated by each sampling point that constitutes each of the frequency area spectrums while unifying directions included in coordinates of the frequency area spectrums, and generating an integrated frequency area spectrum, and detecting a physical property of the waves included in the analysis area by calculating with the processing circuitry wave information that is information related to the physical property of the waves based on the integrated frequency area spectrum, respectively.

(12) According to another aspect of the present disclosure, a non-transitory computer storage medium having computer readable instructions stored therein that when executed by processing circuitry executes a method of processing echoes of radar pulses from waves on a body of water included in a detection area, the method including:

performing a frequency analysis of the echoes from the waves included in a plurality of analysis areas within the detection area, respectively, and generating frequency area spectrums for the plurality of analysis areas, respectively, integrating echo intensity indicated by each sampling point that constitutes each of the frequency area spectrums while unifying directions included in coordinates of the frequency area spectrums, and generating an integrated frequency area spectrum, and detecting a physical property of the waves included in the analysis area by calculating with the processing circuitry wave information that is information related to the physical property of the waves based on the integrated frequency area spectrum, respectively.

Effect of the Disclosure

According to the present disclosure, the wave information is accurately calculated.

DETAILED DESCRIPTION

Hereinafter, one embodiment of a signal processor as a signal processing device according to the present disclosure and a radar apparatus provided with the signal processor is described with reference to the drawings. The present disclosure may be widely applicable to signal processing devices which acquire wave information, and radar apparatuses provided with the signal processing device.

Figure 1:
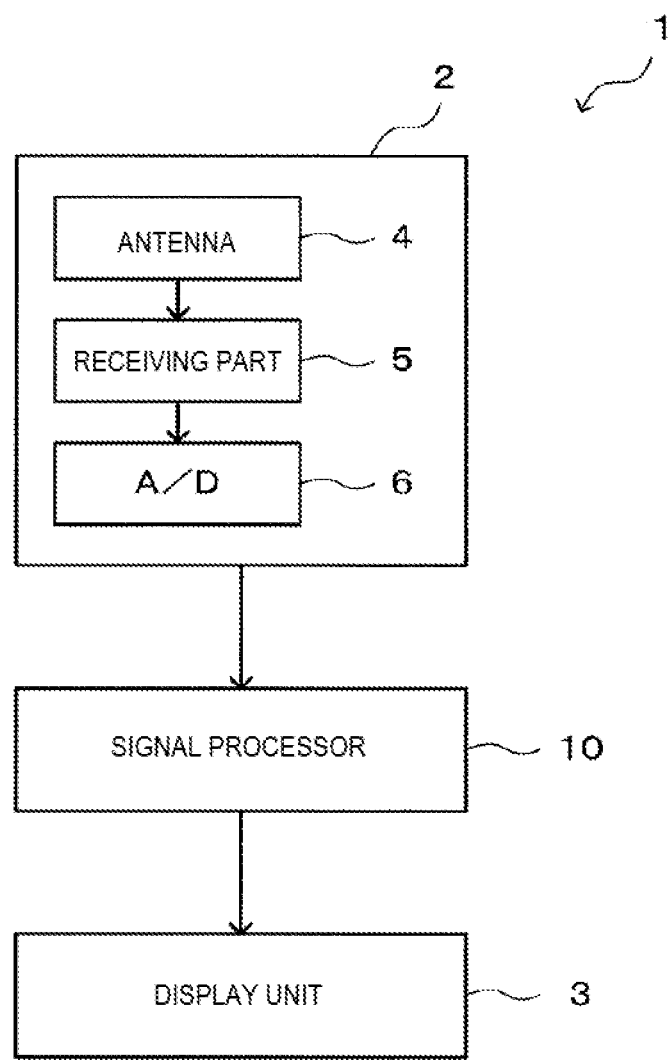
FIG. 1 is a block diagram of a radar apparatus according to one embodiment of the present disclosure.

FIG. 1 is a block diagram of a radar apparatus 1 according to one embodiment of the present disclosure. The radar apparatus 1 according to this embodiment may calculate wave information (specifically, a wave height, a wavelength, etc.) which is information related to a wave, based on an echo obtained by a transmission wave transmitted being reflected on the wave and coming back. Moreover, the radar apparatus 1 may be configured to be capable of detecting ships which exist within a detection area. The radar apparatus 1 of this embodiment may be provided to, for example, a ship (hereinafter, referred to as "the ship" to be distinguished from other ships), such as a fishing boat.

As illustrated in FIG. 1, the radar apparatus 1 may include an antenna unit 2, a signal processor 10, and a display unit 3.

The antenna unit 2 may include an antenna 4 which functions to support both transmitter and receiver operations, a receiving part 5 (a receiver), and an A/D converter 6.

The antenna 4 may be a radar antenna which is capable of transmitting a pulse-shaped radio wave as a transmission wave with a strong directivity. Moreover, the antenna 4 may be configured to receive a reflection wave from a target object (in this embodiment, the wave or another ship). The radar apparatus 1 may measure a period of time after a transmission of the pulse-shaped radio wave to a reception of the reflection wave. Thus, the radar apparatus 1 may be capable of detecting a distance r to the target object. The antenna 4 may be configured to be capable of rotating 360° in a horizontal plane. The antenna 4 may be configured to repeat the transmission and reception of the radio wave, while changing the transmitting direction of the pulse-shaped radio wave (e.g., changing an antenna angle). With the above configuration, the radar apparatus 1 may be capable of detecting the target object in the plane around the ship over 360°.

Note that, in the following description, operation after the transmission of the pulse-shaped radio wave until a transmission of a subsequent pulse-shaped radio wave may be referred to as a "sweep." Moreover, operation of a 360° rotation of the antenna while transmitting and receiving the radio wave may be referred to as a "scan."

The receiving part 5 may detect and amplify the echo signal acquired from the echo received by the antenna 4. The receiving part 5 may output the amplified echo signal to the A/D converter 6. The A/D converter 6 may sample the echo signal of an analog format, and convert it into digital data comprised of multiple bits. This digital data may be echo data. The echo data may include data to identify an intensity of the echo signal acquired from the reflection wave received by the antenna 4. The A/D converter 6 may output the echo data to the signal processor 10.

Figure 2:
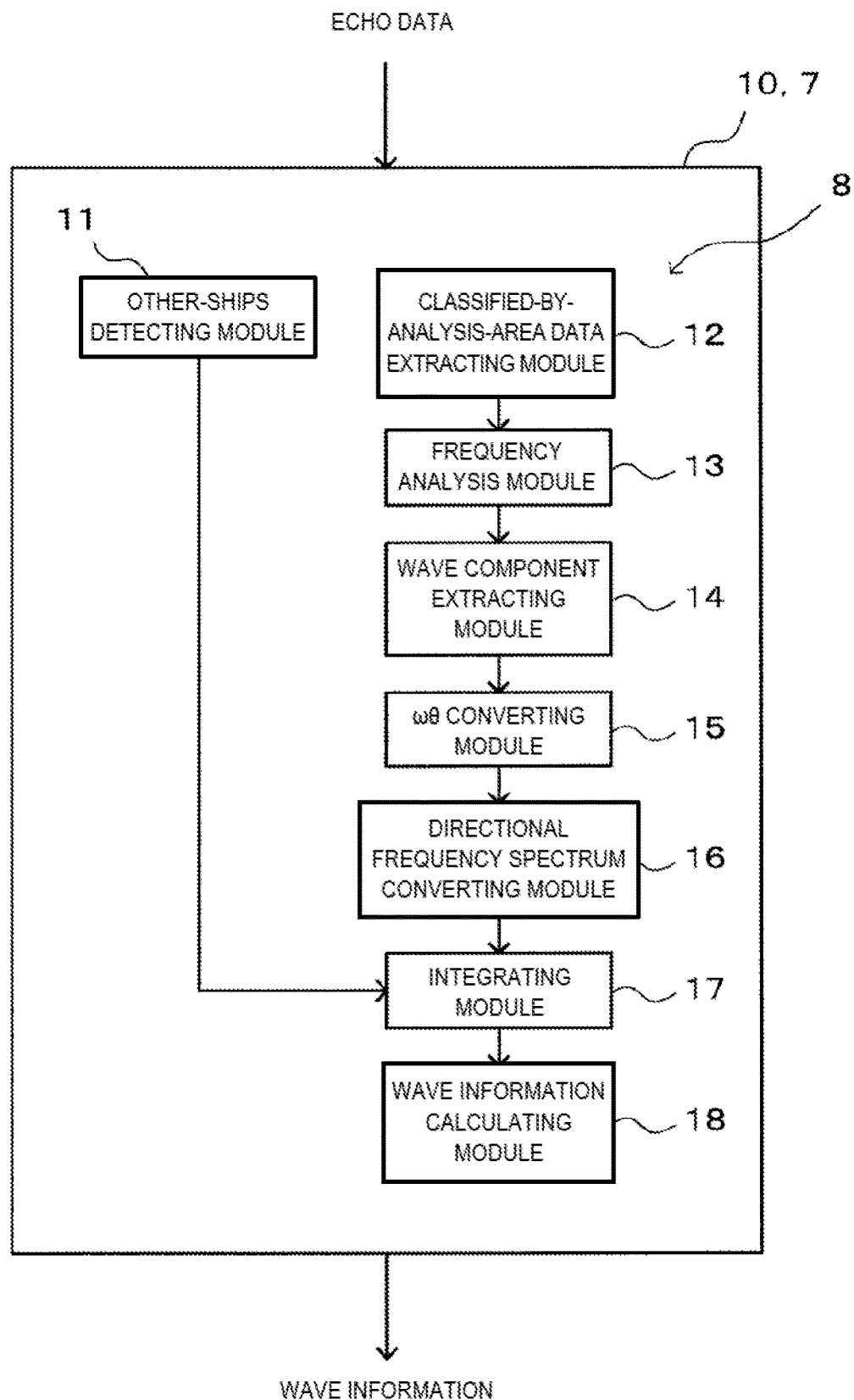
FIG. 2 is a block diagram of a signal processor illustrated in FIG. 1.

FIG. 2 is a block diagram of the signal processor 10 illustrated in FIG. 1. The signal processor 10 may include an other-ships detecting module 11 (unnecessary target object detecting module), a frequency area spectrum generating module 8, an integrating module 17, and a wave information calculating module 18.

The signal processor 10 may be comprised of devices (e.g., processing circuitry), such as a hardware processor 7 (e.g., a CPU, an FPGA, etc.), and a nonvolatile memory. For example, the CPU may read and execute a program from the nonvolatile memory to function the signal processor 10 as the other-ships detecting module 11, the frequency area spectrum generating module 8, the integrating module 17, and the wave information calculating module 18.

The other-ships detecting module 11 may extract echo images resulting from other ships (unnecessary target objects). For example, the other-ships detecting module 11 may group, among sampling points having the echo intensity greater than a given threshold, sampling points of which a mutual distance is below a given distance because they are able to be considered as echoes from the same ship. Then, the other-ships detecting module 11 may detect an echo image comprised of a plurality of grouped sampling points, as an echo image from the same ship.

Figure 3:
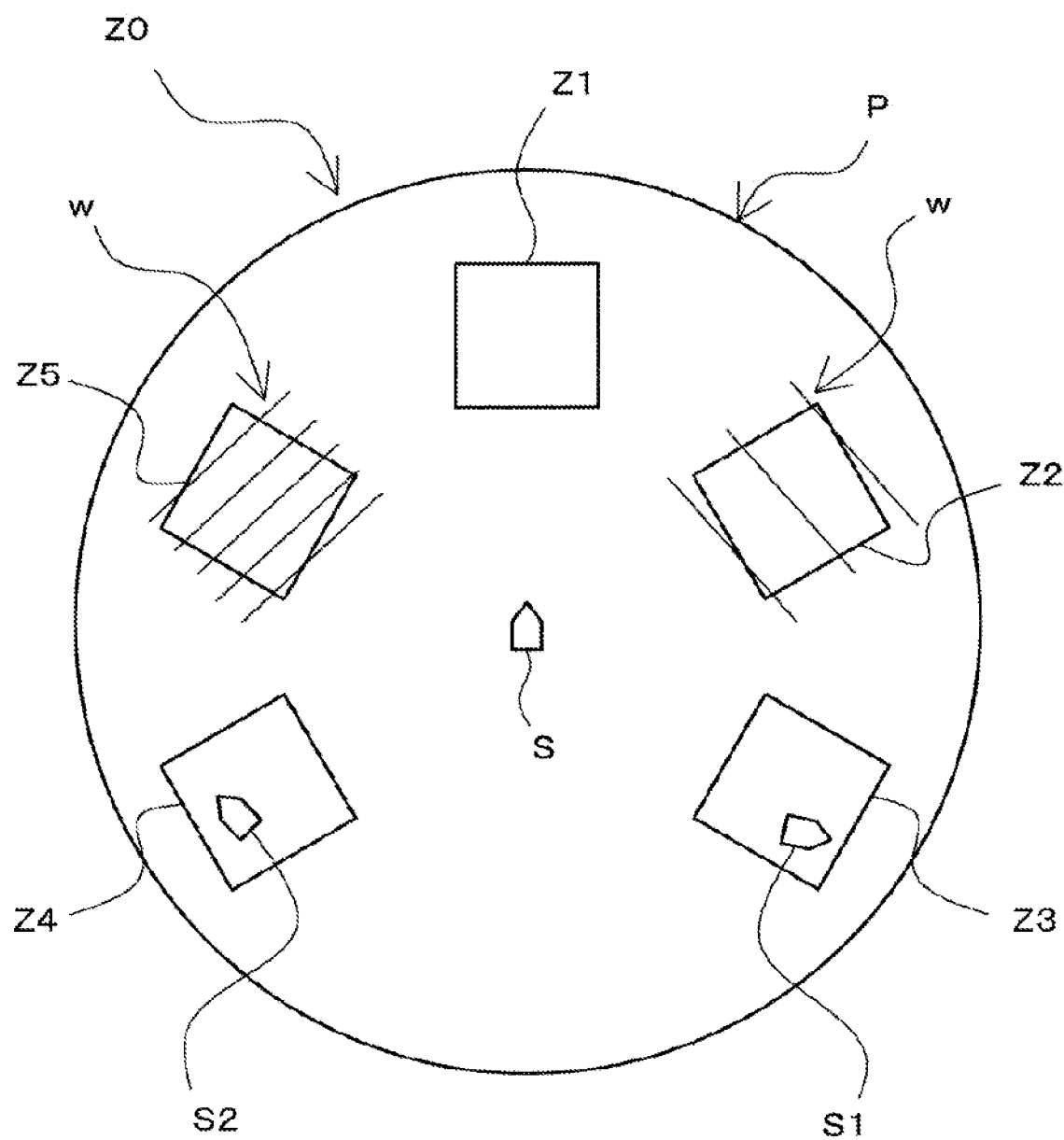
FIG. 3 is a view illustrating positions etc. of analysis areas where classified-by-analysis-area echo data is extracted, the classified-by-analysis-area echo data being extracted by a classified-by-analysis-area data extracting module illustrated in FIG. 2.

FIG. 3 is a view illustrating positions etc. of analysis areas Z1-Z5 where classified-by-analysis-area echo data is extracted, the classified-by-analysis-area echo data being extracted by a classified-by-analysis-area data extracting module 12 provided to the frequency area spectrum generating module 8. The frequency area spectrum generating module 8 may carry out a frequency analysis of the echoes obtained from waves included in each range of the plurality of analysis areas Z1-Z5 and generate a directional frequency spectrum (frequency area spectrum) for each of the plurality of analysis areas Z1-Z5.

Note that, in this embodiment, the analysis areas Z1-Z5 may have the same shape and size. Moreover, the analysis areas Z1-Z5 may be disposed at the same distance with respect to the ship S. Moreover, the analysis areas Z1-Z5 may be provided as areas surrounded by straight lines parallel and perpendicular to a straight line which connects the ship S and a central point of each analysis area. By setting the analysis areas Z1-Z5 as described above, the positions and shape of the analysis areas Z1-Z5 when seen from the ship S may be unified. Thus, since, as coordinate axes of the analysis areas Z1-Z5, axes which are substantially parallel to directions from the ship S toward the central points of the analysis areas Z1-Z5 are set, resolutions of the echo data in the axis directions of the analysis areas may become almost the same. Therefore, more accurate wave analysis results may be obtained.

Note that, when the analysis areas are set as described above, since directions of coordinate axes of kxky spectrums (spectrums generated by a wave component extracting module 14 described later) differ, the kxky spectrums obtained from the analysis areas Z1-Z5 cannot be integrated simply as they are. However, by converting the kxky spectrums into $\omega\theta$ coordinates described later to align the $\theta$-axis, an echo spectrums obtained from the analysis areas Z1-Z5 (e.g., the directional frequency spectrums obtained from the analysis areas Z1-Z5) can be integrated.

The frequency area spectrum generating module 8 may include the classified-by-analysis-area data extracting module 12, a frequency analysis module 13, the wave component extracting module 14, a $\omega\theta$ converting module 15, and a directional frequency spectrum converting module 16.

The classified-by-analysis-area data extracting module 12 may extract the classified-by-analysis-area echo data included in the analysis areas Z1-Z5. In this embodiment, the number, the positions, and size of the analysis areas Z1-Z5 may be determined beforehand. In this embodiment, the five analysis areas Z1-Z5 may be disposed at the positions with the same distance with respect to the ship S. For example, with reference to FIG. 3, the analysis area Z1 may be disposed in the bow direction of the ship S, the analysis area Z2 may be disposed in the 60° direction to the right with respect to the bow direction of the ship S, the analysis area Z3 may be disposed in the 120° direction to the right with respect to the bow direction of the ship S, the analysis area Z4 may be disposed in the 120° direction to the left with respect to the bow direction of the ship S, and the analysis area Z5 may be disposed in the 60° direction to the left with respect to the bow direction of the ship S.

FIG. 3 illustrates one example in which comparatively high waves moving in the incoming direction toward the ship S or the outgoing direction from the ship S exist in the analysis areas Z2 and Z5. In FIG. 3, these waves are indicated as apparent wave crest lines w. Note that, although comparatively low waves also exist in areas other than the analysis areas Z2 and Z5 in FIG. 3, illustration of these waves are omitted. FIG. 3 also illustrates one example in which other ships S1 and S2 exist in the analysis areas Z3 and Z4.

The classified-by-analysis-area data extracting module 12 may extract for every scan the classified-by-analysis-area echo data as the echo data included in the plurality of analysis areas Z1-Z5 included in an echo image P in a detection area Z0 obtained by one scan. Thus, the classified-by-analysis-area data extracting module 12 may extract the classified-by-analysis-area echo data for a plurality of scans (e.g., 32 sheets) for each of the analysis areas Z1-Z5.

Note that the number, positions and size of the analysis areas Z1-Z5 illustrated in FIG. 3 may be merely examples, and the number, positions, and size of the analysis areas are not limited to the number, positions, and size illustrated in FIG. 3, and may be other numbers, positions, and sizes.

The frequency analysis module 13 may carry out the frequency analysis of the 32 sheets of the classified-by-analysis-area echo data for the analysis areas Z1-Z5. For example, the frequency analysis module 13 may perform a three-dimensional Fast Fourier Transform (3D FFT) processing using the 32 sheets of classified-by-analysis-area echo data for each of the analysis areas Z1-Z5. Thus, the 3D data may be generated for every analysis area, where the units of x-axis and y-axis are rad/m, and the unit of z-axis is rad/sec. The x-axis in the 3D data may be a wave number kx in the east-west directions, the y-axis may be a wave number ky in the north-south directions, and the z-axis may be an angular frequency $\omega$. The frequency analysis module 13 may generate the 3D data for each of the analysis areas Z1-Z5.

The wave component extracting module 14 may extract wave components resulting from the waves from the 3D data obtained by the frequency analysis module 13. For example, the wave component extracting module 14 may extract from the 3D data, the wave components by using only information on a spectrum close to a dispersion relation of a wave expressed by the following Formulas (1) and (2). The wave component extracting module 14 may extract the wave components for each of the analysis areas Z1-Z5.

$$\omega^2 = gk \tan h(kd) \quad (1)$$

$$\omega^2 = gk \quad (2)$$

Here, $\omega$ is an angular frequency, k is a wave number, g is a gravitational acceleration, and d is a water depth. Formula (2) may be used when the water depth is deep enough, particularly when the water depth is greater than a half-wavelength, and Formula (1) may be used when Formula (2) is not used.

The $\omega\theta$ converting module 15 may convert the spectrums of the wave components extracted by the wave component extracting module 14 into rectangular coordinates ($\omega\theta$ coordinates) where the x-axis corresponds to a wave direction $\theta$ with respect to the ship S and the y-axis corresponds to the angular frequency $\omega$, to generate $\omega\theta$ spectrums. The $\omega\theta$ converting module may generate the $\omega\theta$ spectrum for each of the analysis areas Z1-Z5.

Figure 4:
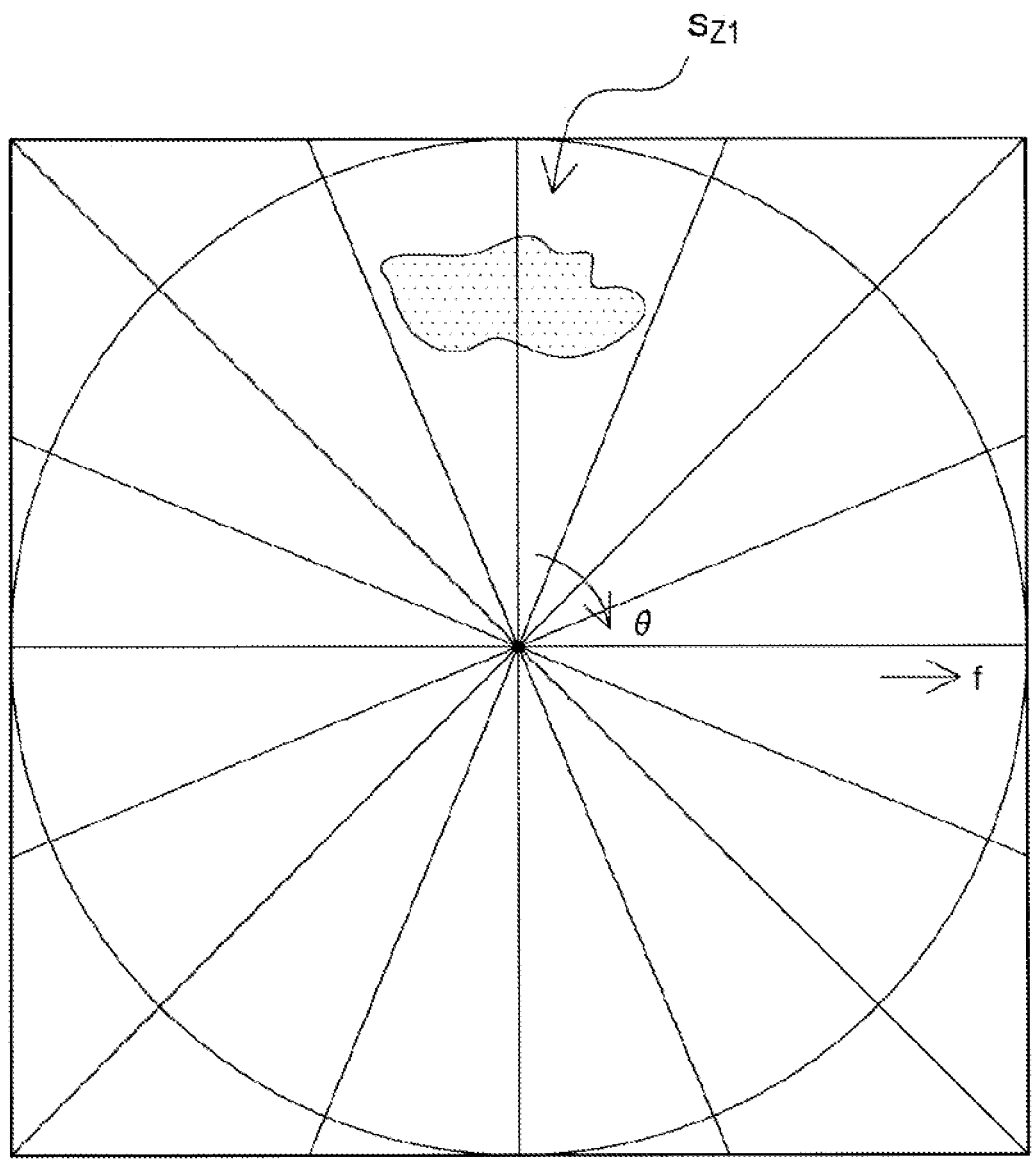
FIG. 4 is a view illustrating a directional frequency spectrum generated by a directional frequency spectrum converting module, where a directional frequency spectrum obtained from an analysis area Z1 is illustrated.
Figure 5:
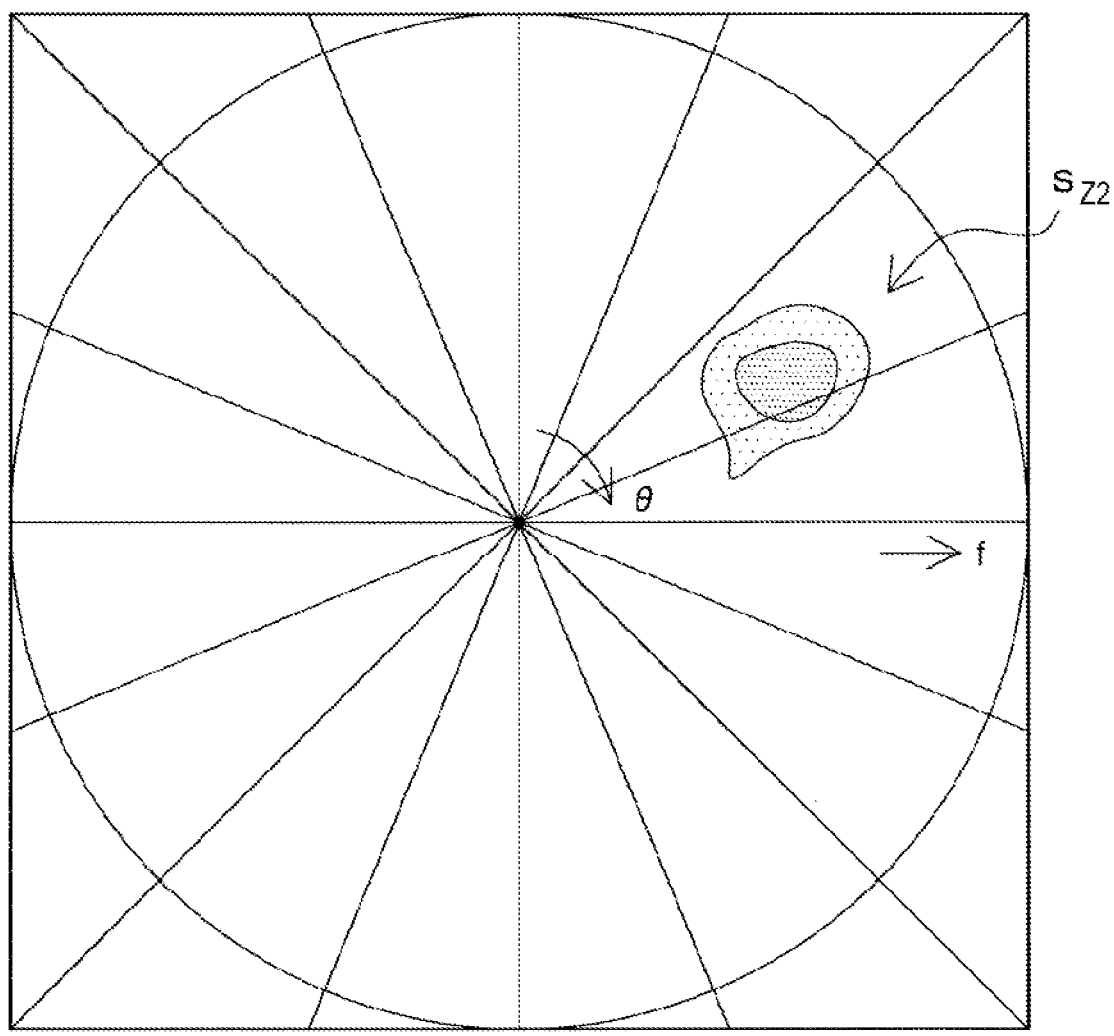
FIG. 5 is a view illustrating the directional frequency spectrum generated by the directional frequency spectrum converting module, where a directional frequency spectrum obtained from an analysis area Z2 is illustrated.
Figure 6:
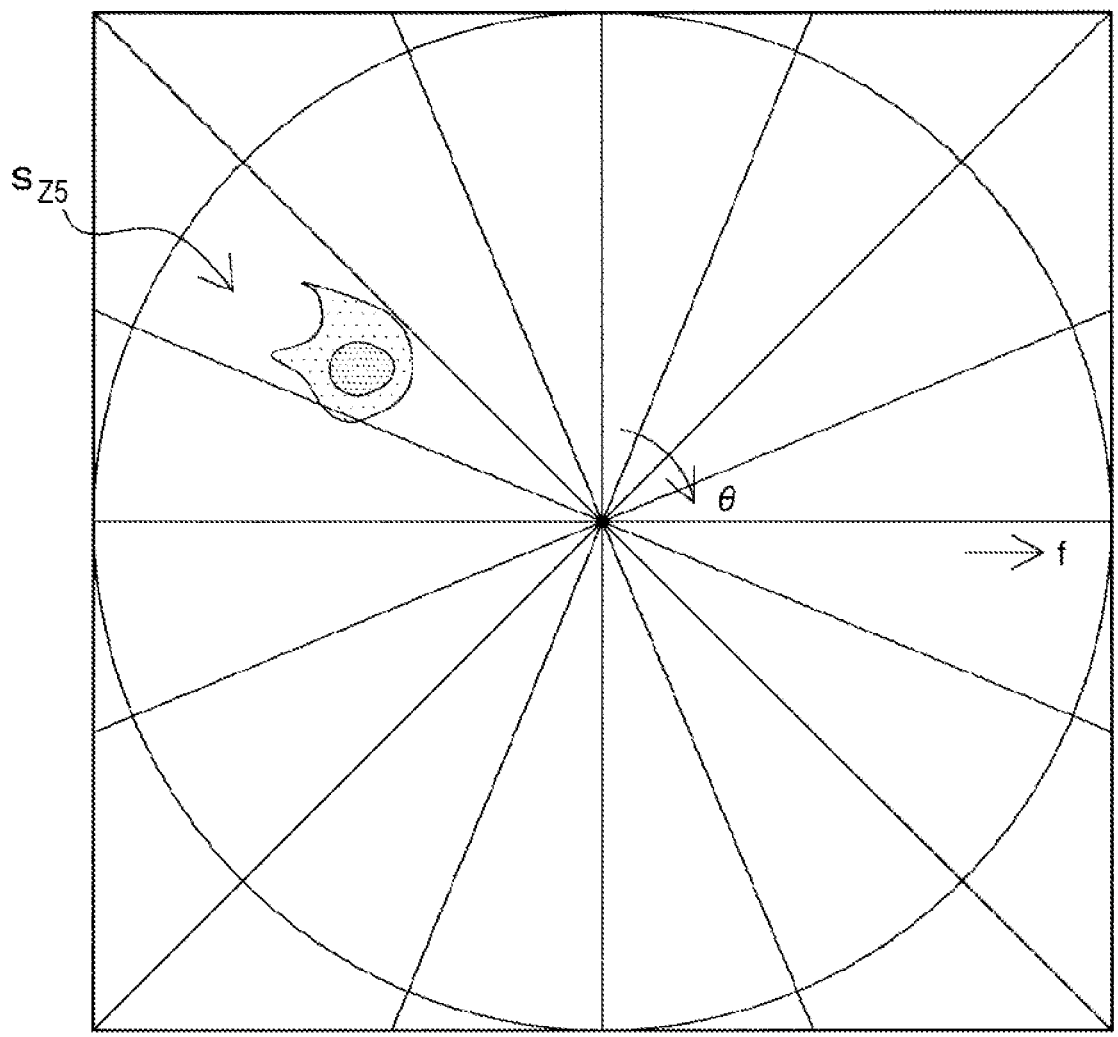
FIG. 6 is a view illustrating the directional frequency spectrum generated by the directional frequency spectrum converting module, where a directional frequency spectrum obtained from an analysis area Z5 is illustrated.

FIGS. 4 to 6 are views illustrating the directional frequency spectrums generated by the directional frequency spectrum converting module 16. For example, FIG. 4 is a view illustrating the directional frequency spectrum obtained from the analysis area Z1, FIG. 5 is a view illustrating the directional frequency spectrum obtained from the analysis area Z2, and FIG. 6 is a view illustrating the directional frequency spectrum obtained from the analysis area Z5.

The directional frequency spectrum converting module 16 may convert the $\omega$ spectrums generated by the $\omega\theta$ converting module 15 into directional frequency spectrums $S_{Zn}$ (n=1, 2, ..., N). In this embodiment, since the five analysis areas are set, N=5, and the number of directional frequency spectrums $S_{Zn}$ generated corresponding to the analysis areas Z1-Z5 may also be five.

The directional frequency spectrums $S_{Zn}$ are spectrums obtained by performing a coordinate conversion of the positions of the respective sampling points which constitute the $\omega\theta$ spectrums generated by the $\omega\theta$ converting module 15 at polar coordinates where the ship provided with the radar apparatus 1 is used as the origin, the circumferential directions correspond to the direction $\theta$ of the wave with respect to the ship S, and the radial direction corresponds to a frequency f of the wave. The directional frequency spectrums $S_{Zn}$ may have the intensity of the echo intensity (corresponding to the height of the wave) at each sampling point which constitutes each location of the polar coordinates, as information. Note that in FIGS. 4 to 6, the intensity of the echo intensity at each sampling point is illustrated corresponding to the density of hatching comprised of dots. That is, the echo intensities at the sampling points which constitute the dense part of the dot hatching may be higher than the echo intensities at the sampling points which constitute the thin part of the dot hatching.

Figure 7:
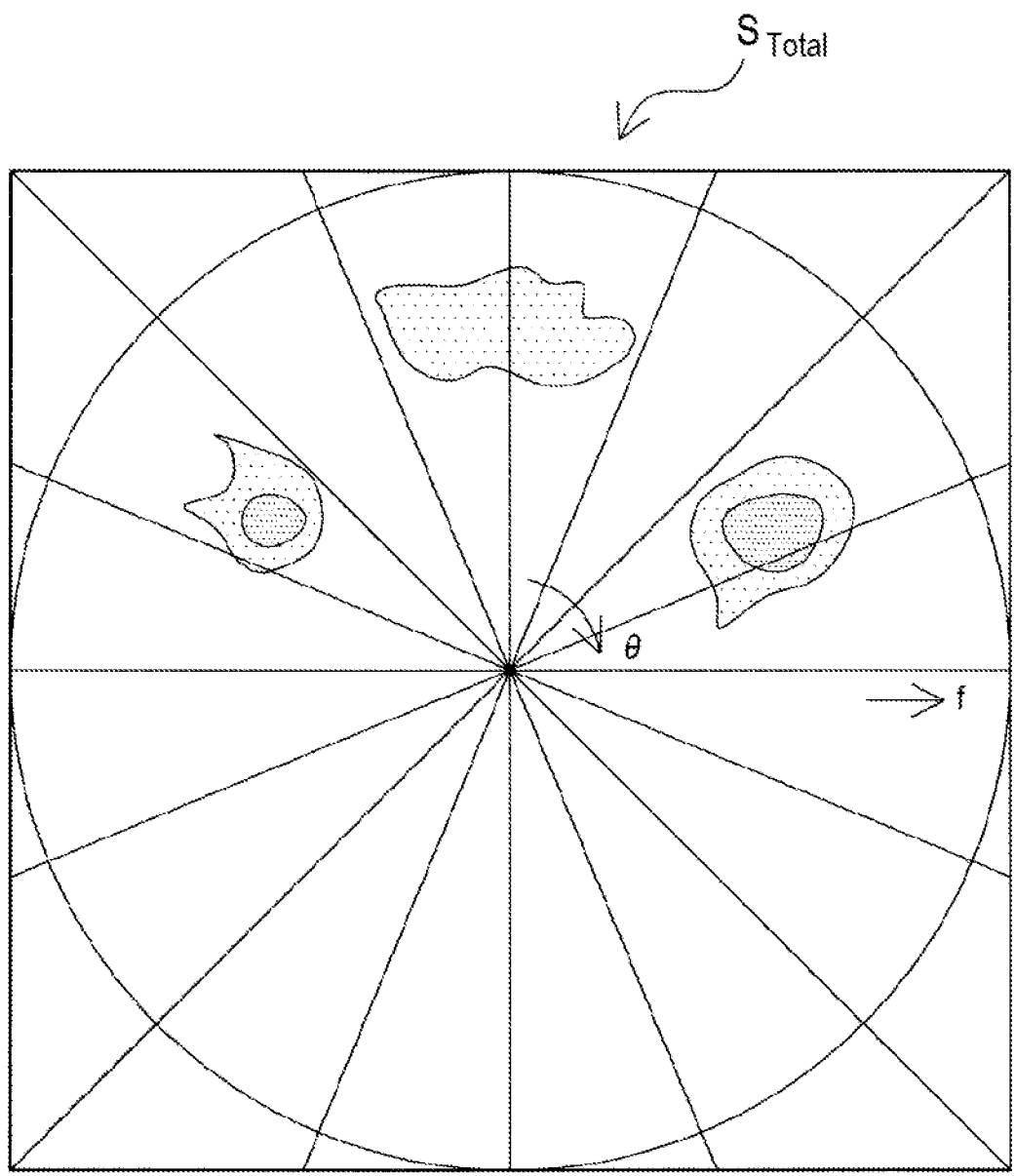
FIG. 7 is a view illustrating an integrated directional frequency spectrum generated by an integrating module.

FIG. 7 is a view illustrating an integrated directional frequency spectrum $S_{total}$ generated by the integrating module 17. The integrating module 17 may integrate the directional frequency spectrums $S_{Zn}$ generated by the directional frequency spectrum converting module 16, and calculate the integrated directional frequency spectrum $S_{total}(i, j)$. For example, the integrating module 17 calculates the integrated directional frequency spectrum $S_{total}(i, j)$ by using the following Formula (3).

$$S_{total}(i, j) = \sum_{n=1}^{N} \beta_{zn} S_{zn}(i, j) \quad (3)$$

Here, $S_{total}$ represents the integrated directional frequency spectrum, where $S_{total}(i, j)$ is a spectral power (echo intensity) in an arbitrary direction i (0° to 360° with respect to the ship) and at an arbitrary frequency j. As apparent from Formula (3), the directional frequency spectrums $S_{Zn}$ may be integrated where their directions are unified. For example, weight coefficients $\beta_{Zn}$ may be added to the spectral powers at the same frequency which are obtained from the same direction in the directional frequency spectrums $S_{Zn}$ and they may be then summed up to be integrated. Note that $\beta_{Zn}$ may be the weight coefficients set corresponding to the analysis areas Z1-Z5, and a method of setting $\beta_{Zn}$ is described below.

In this embodiment, a calculation of the integrated spectrum $S_{total}(i, j)$ may be performed as follows. For example, as for the directional frequency spectrum $S_{Z3}(i, j)$ obtained from the analysis area Z3 (see FIG. 3) where another ship is detected, 0 may be used as the weight coefficient $\beta_{Z3}$. Similarly, as for the directional frequency spectrum $S_{Z4}(i, j)$ obtained from the analysis area Z4 where another ship is detected, 0 may be used as the weight coefficient $\beta_{Z4}$. On the other hand, the directional frequency spectrums $S_{Zn}(i, j)$ obtained from the analysis areas Z1, Z2 and Z5 where other ships are not detected, 1 may be used as the weight coefficients $\beta_{Zn}$. That is, the directional frequency spectrums $S_{Z3}(i, j)$ and $S_{Z4}(i, j)$ included in the analysis areas where other ships are detected may be excluded from the candidates for the integration of the integrated directional frequency spectrum $S_{total}(i, j)$.

The wave information calculating module 18 may calculate the wave information, such as the wave height and the wavelength of the wave, based on the integrated directional frequency spectrum $S_{total}$ calculated by the integrating module 17. For example, the wave height and the wavelength of the wave at a selected location, which is selected by a user using an external device, in the integrated directional frequency spectrum $S_{total}$ may be calculated. The wave height may be calculated based on the echo intensity at the selected location. The wavelength may be calculated based on the frequency f at the selected location. These values calculated by the wave information calculating module 18 may be notified to the display unit 3. The display unit 3 may display these values.

Meanwhile, when calculating the wave information, if another ship is included in the analysis area for which the wave information is calculated, echoes related to another ship, a wake of another ship, etc. may exist in the analysis area. Thus, accurate information cannot be acquired even the wave information is calculated using the echo data in the analysis area. In this embodiment, with reference to FIG. 3, the accurate wave information cannot be acquired from the analysis area Z3 where another ship S1 is included, and the analysis area Z4 where another ship S2 is included.

Regarding this, in the signal processor 10 of the radar apparatus 1 according to this embodiment, with reference to FIGS. 3 and 7, only the directional frequency spectrums $S_{Zn}$ obtained from the analysis areas Z1, Z2 and Z5, among the plurality of analysis areas Z1-Z5 other than the analysis areas Z3 and Z4 where other ships are included, may be integrated. Thus, the wave information may be accurately calculated.

[Effects]

As described above, in the signal processor 10 of the radar apparatus 1 according to this embodiment, the spectral powers (echo intensities) of the directional frequency spectrums $S_{Zn}$ generated corresponding to the analysis areas Z1-Z5 may be integrated where their directions are unified, as shown in Formula (3). Then, in the radar apparatus 1, the wave information, such as the wave height and the wavelength, may be calculated based on the integrated directional frequency spectrum $S_{total}$ integrated as described above.

For example, conventionally, only one analysis area is set, and wave information is calculated based on echo data obtained from the analysis area. However, if an unnecessary target object (e.g., another ship) different from a wave exists in the analysis area, the wave information on the analysis area cannot be calculated accurately due to the target object.

Regarding to this, according to the radar apparatus 1, the wave information may be calculated based on the integrated directional frequency spectrum $S_{total}$ obtained by integrating the directional frequency spectrums $S_{Zn}$ generated for the plurality of analysis areas Z1-Z5 as described above. Thus, for example, it is possible to exclude the directional frequency spectrums $S_{Z3}$ and $S_{Z4}$ of the analysis areas where the unnecessary target objects are entered (in this embodiment, Z3 and Z4), from the candidates for which the integrated directional frequency spectrum $S_{total}$ is generated. Alternatively, it is possible to reduce the degree of influences by the directional frequency spectrums $S_{Z3}$ and $S_{Z4}$ obtained from the analysis areas Z3 and Z4 where the unnecessary target objects are entered. That is, according to the radar apparatus 1, it may be possible to reduce the influences by the directional frequency spectrums $S_{Z3}$ and $S_{Z4}$ from the analysis areas Z3 and Z4 which are low in the reliability when calculating the wave information. Thus, it may be possible to calculate the wave information based on the directional frequency spectrums $S_{Z1}$, $S_{Z2}$ and $S_{Z5}$ obtained from other analysis areas, i.e., the analysis areas Z1, Z2 and Z5 which are high in the reliability when calculating the wave information.

Therefore, according to the signal processor 10, the wave information may be accurately calculated.

Moreover, in the signal processor 10, the directional frequency spectrums $S_{Zn}$ obtained by multiplying the plurality of directional frequency spectrums $S_{Zn}$ by the respective weight coefficients $\beta_{Zn}$ determined corresponding to the plurality of directional frequency spectrums $S_{Zn}$ may be integrated to generate the integrated directional frequency spectrum $S_{total}(i, j)$. Thus, since it becomes possible to set the values of the weight coefficients $\beta_{Zn}$ according to the reliability of the directional frequency spectrums $S_{Zn}$ when calculating the wave information, the wave information may be calculated more accurately.

Moreover, like the signal processor 10, the values of the weight coefficients $\beta_{Zn}$ may be determined according to the unnecessary target objects which give adverse influences when calculating the accurate wave information to appropriately set the values of the weight coefficients $\beta_{Zn}$.

Moreover, like the signal processor 10, the values of the weight coefficients $\beta_{Z3}$ and $\beta_{Z4}$ of the directional frequency spectrums $S_{Z3}$ and $S_{Z4}$ obtained from the analysis areas Z3 and Z4 where the unnecessary target objects are detected may be set to zero to significantly reduce the influences which the unnecessary target objects which may give the adverse influences when calculating the wave information give to the wave information.

Moreover, like the signal processor 10, the values of the weight coefficients $\beta_{Zn}$ of the directional frequency spectrums $S_{Z3}$ and $S_{Z4}$ obtained from the analysis areas Z3 and Z4 where other ships are detected is set to zero to prevent that the echoes of other ships or the echoes resulting from the wakes of other ships give influences to the wave information.

Moreover, according to the signal processor 10, since the directional frequency spectrums are generated based on the wave components extracted by the wave component extracting module 14, the echoes resulting from the unnecessary target objects may become difficult to be reflected in the wave information. Thus, the wave information may be calculated more accurately.

Moreover, according to the radar apparatus 1, the radar apparatus provided with the signal processor 10 which is capable of calculating the wave information accurately may be configured.

Moreover, according to the radar apparatus 1, the echoes from other ships as the unnecessary target objects may be received using the antenna 4 which receives the echoes from the waves, and other ships may be detected based on the echoes. That is, according to the radar apparatus 1, since other ships are detectable using the antenna 4 provided to the radar apparatus 1 for calculating the wave information, it may become unnecessary to provide other special equipment in order to detect other ships. Therefore, according to the radar apparatus 1, the configuration of the apparatus may be simplified.

[Modifications]

As described above, although the embodiment of the present disclosure is described, the present disclosure is not limited to the embodiment and various changes may be possible without departing from the scope of the present disclosure.

Figure 8:
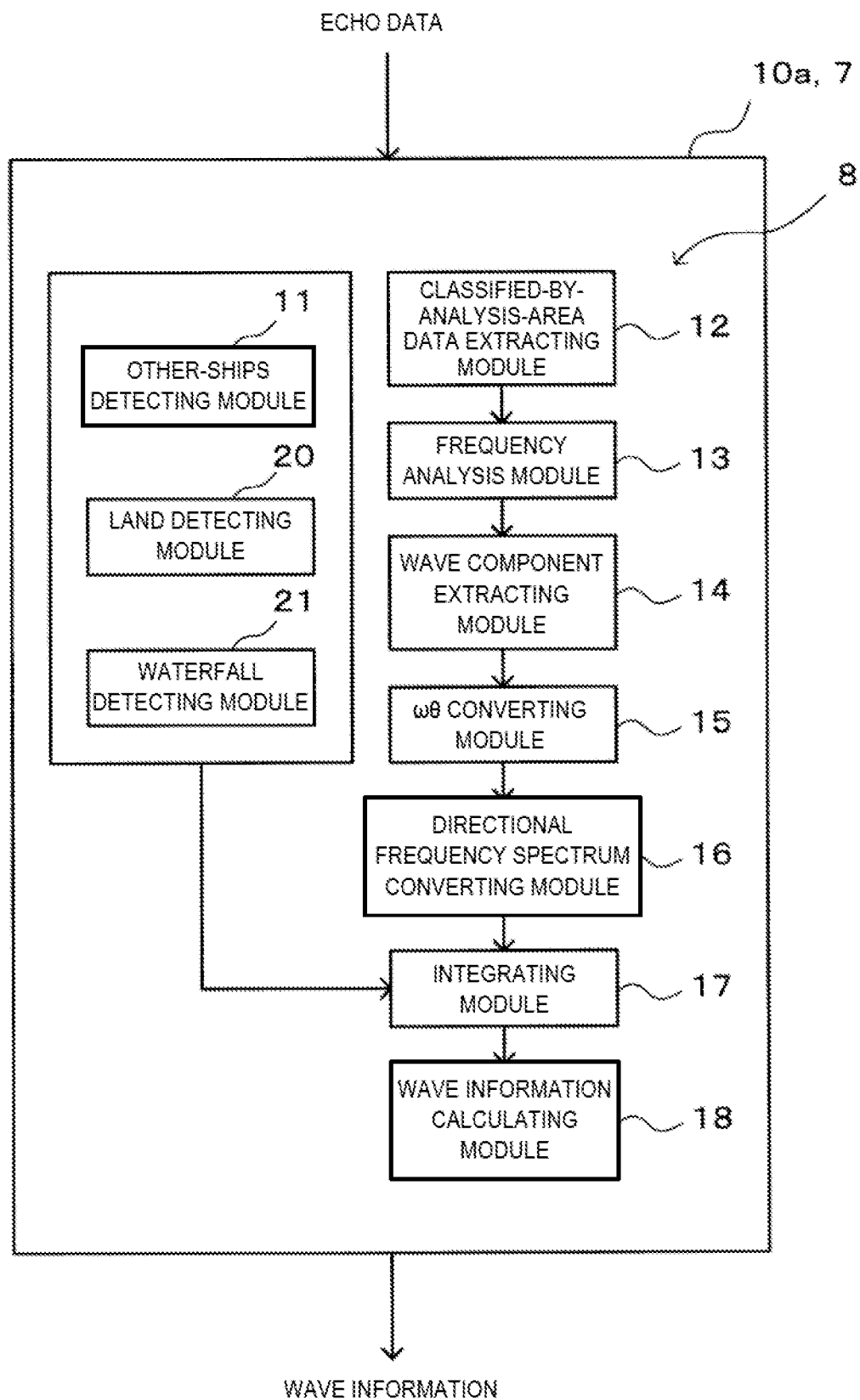
FIG. 8 is a block diagram of a signal processor of the radar apparatus according to one modification.

(1) FIG. 8 is a block diagram of a signal processor 10a of the radar apparatus according to one modification. Although in the above embodiment, for the analysis areas where other ships exist, the spectral powers of the locations within the areas are excluded from the candidates for the integration of the integrated directional frequency spectrum, but the present disclosure is not limited to this configuration. For example, the spectral powers at locations within the analysis areas where land is included or the analysis areas where waterfall more than a given quantity is observed may also be excluded from the candidates for the integration of the integrated directional frequency spectrum.

The signal processor 10a of this modification may have a land detecting module 20 and a waterfall detecting module 21 as the unnecessary target object detecting modules, other than the components which the signal processor 10 of the above embodiment has.

The land detecting module 20 may detect land included in a detection area. For example, the land detecting module 20 may compare the position of the land included in a nautical chart stored in the radar apparatus 1 according to this modification with the position of the echo obtained by the radar apparatus 1 to determine whether the echo is an echo from the land.

The waterfall detecting module 21 may detect an area where rain or snow falls within the detection area. An echo from the rain or snow may have a more gradual inclination of the rising part and the falling part than those of ships and land. The waterfall detecting module 21 may determine whether the echo is an echo from the rain or snow based on such a feature of the rain or snow, i.e., based on the degree of the inclination of the rising part and the falling part described above.

The integrating module 17 may calculate the integrated directional frequency spectrum $S_{total}$ by using Formula (3), substantially similar to the above embodiment. Note that, unlike the above embodiment, the integrating module 17 may use 0 as the weight coefficients $\beta_{Zn}$ of the spectral powers at locations included in the analysis areas where the land and the rain or snow are detected. That is, the integrating module 17 may also exclude the spectral powers at the locations included in the analysis areas where the land and the rain or snow are detected, from the candidates for the integration of the integrated directional frequency spectrum.

As described above, according to the signal processor 10a of the radar apparatus according to this modification, the directional frequency spectrums obtained from the analysis areas where the land or the rain or snow is detected may be also excluded from the candidates for the integration of the integrated directional frequency spectrum, as well as the directional frequency spectrums obtained from the analysis areas where other ships are detected. Thus, the wave information may be calculated more accurately, compared with the case where only the directional frequency spectrums obtained from the analysis areas where other ships are detected is excluded from the candidates for the integration of the integrated directional frequency spectrum.

(2) Although in the above embodiment and each modification, the weight coefficient $\beta_{Zn}$ at the time of the spectral power integration is determined based on the existence of other ships, land, and rain or snow in the analysis areas Z1-Z5, the weight coefficients $\beta_{Zn}$ may be determined based on other factors without being limited to the existence of other ships, land, and rain or snow. For example, the values of the weight coefficients $\beta_{Zn}$ may be determined according to the echo intensity of the wave.

Figure 9:
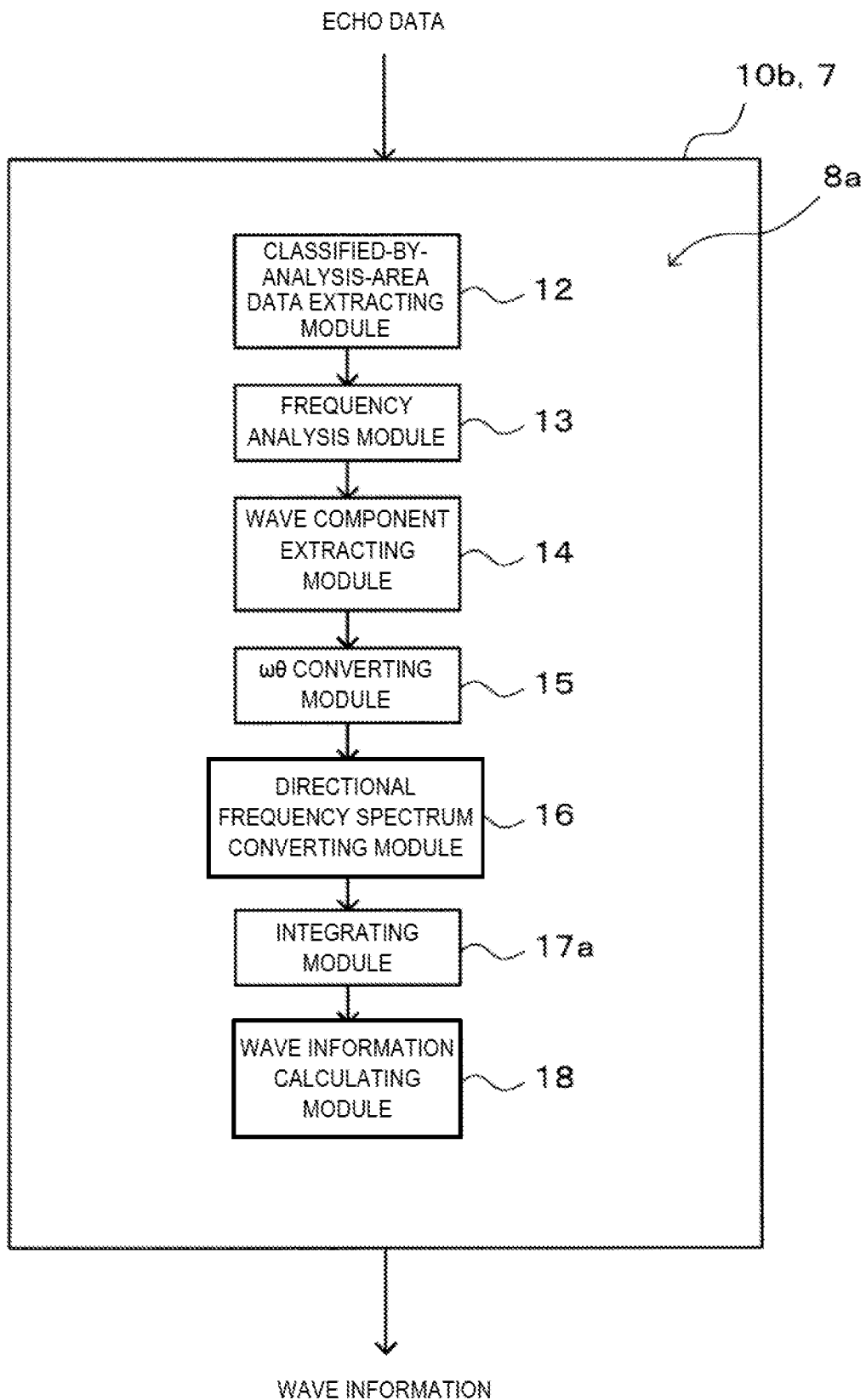
FIG. 9 is a block diagram of a signal processor of the radar apparatus according to one modification.

(3) FIG. 9 is a block diagram of a signal processor 10b of the radar apparatus according to one modification. The signal processor 10b of this modification may have a configuration that the other-ships detecting module 11 is omitted, compared with the signal processor 10 of the above embodiment. Moreover, a frequency area spectrum generating module 8a of the signal processor 10b of this modification may differ in operation of an integrating module 17a, compared with the frequency area spectrum generating module 8 of the above embodiment.

The integrating module 17a may integrate the directional frequency spectrums generated by the directional frequency spectrum converting module 16, similar to the above embodiment, to calculate the integrated directional frequency spectrum $S_{total}(i, j)$. However, the integrating module 17a of this modification may perform a simple summing-up of the directional frequency spectrums generated corresponding to the analysis areas, without performing the weighted addition. That is, the integrating module 17a of this modification may calculate the integrated directional frequency spectrum $S_{total}(i, j)$ by setting all the weight coefficients $\beta_{Zn}(s)$ in Formula (3) to 1.

As described above, according to the signal processor 10b according to this modification, even if the unnecessary target objects are included in some analysis areas among the plurality of analysis areas, the echo data resulting from the unnecessary target objects may be removed by the wave component extracting module 14. That is, like this modification, even if the simple addition is performed without performing the weighted addition of the directional frequency spectrums generated corresponding to the analysis areas, since the unnecessary echoes have already been removed by the wave component extracting module 14, the wave information may be calculated accurately similar to the above embodiment.

Figure 10:
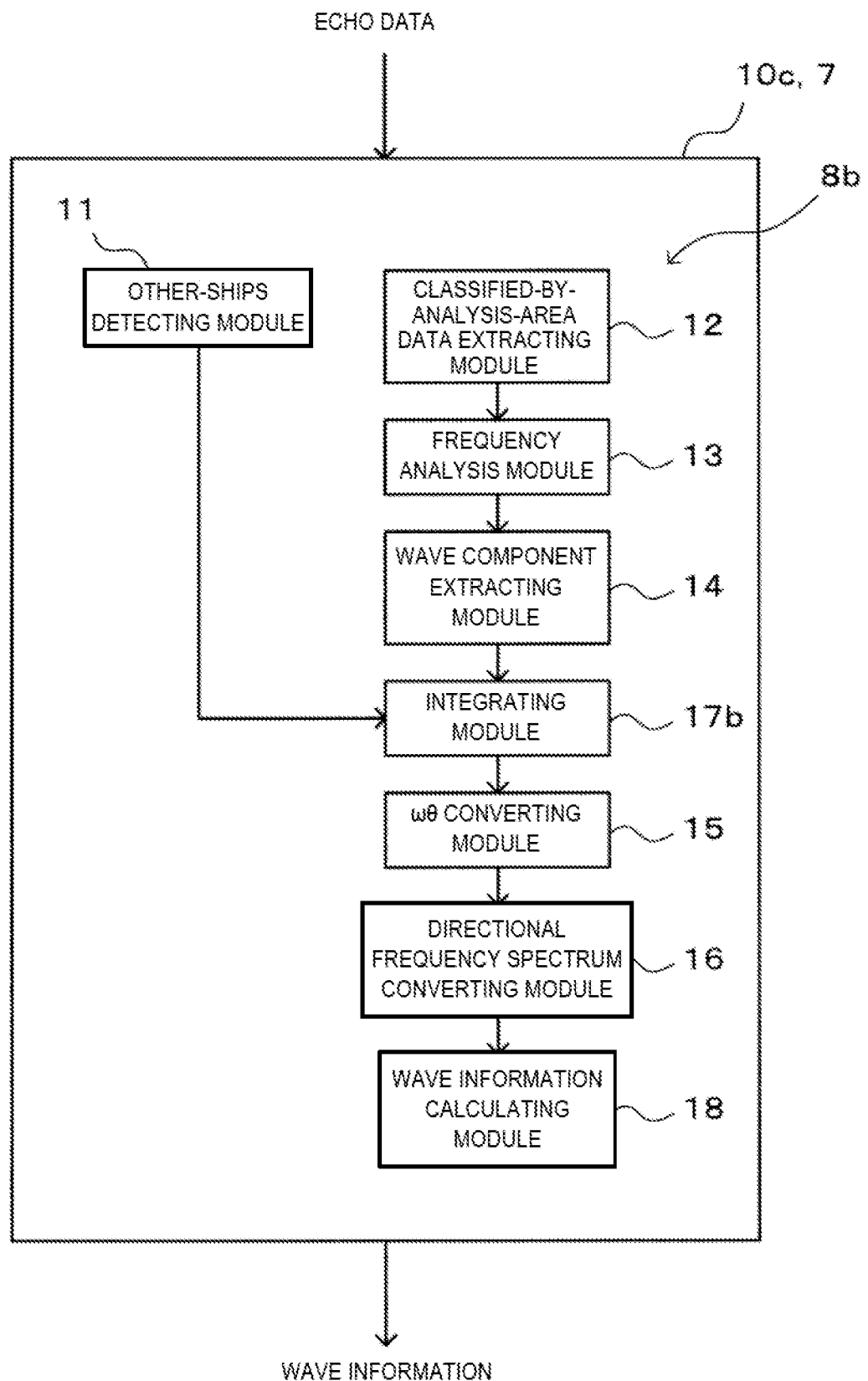
FIG. 10 is a block diagram of a signal processor of the radar apparatus according to one modification.

(4) FIG. 10 is a block diagram of the signal processor 10c of the radar apparatus according to one modification. Although in the above embodiment the integrating module 17 may integrate the spectral powers at the sampling points included in the directional frequency spectrums $S_{Zn}$ obtained from the analysis areas Z1-Z5, the present disclosure is not limited to this configuration. Like the frequency area spectrum generating module 8b of this modification illustrated in FIG. 10, an integrating module 17b may integrate the spectrums of the wave components for every analysis area extracted by the wave component extracting module 14 (kx-ky spectrums, frequency area spectrums). Then, in the frequency area spectrum generating module 8b of this modification, the integrated kx-ky spectrum may be converted into an integrated $\omega\theta$ spectrum by the $\omega\theta$ converting module 15, and the integrated $\omega\theta$ spectrum may be converted into the integrated directional frequency spectrum by the directional frequency spectrum converting module 16. That is, according to this modification, although the process differs, the integrated directional frequency spectrum similar to the above embodiment may be generated, and the wave information may be calculated based on the integrated directional frequency spectrum. Therefore, the wave information may be accurately calculated by the signal processor 10c of this modification, similar to the above embodiment.

What is claimed is:

1. A device configured to process echoes from waves included in a detection area, comprising:
    an antenna configured to receive echoes from waves included in a plurality of analysis areas set within the detection area, respectively; and
    processing circuitry configured to:
        carry out a frequency analysis of the echoes received by the antenna,
        generate frequency area spectrums for the plurality of analysis areas, respectively,
        integrate echo intensity indicated by each sampling point that constitutes each of the frequency area spectrums while unifying directions included in coordinates of the frequency area spectrum, and generate an integrated frequency area spectrum,
        integrate the frequency area spectrums obtained by multiplying the echo intensities at the sampling points by weight coefficients determined for the plurality of frequency area spectrums, respectively, and
        calculate wave information that is information related to the waves included in the analysis areas based on the integrated frequency area spectrum, respectively.

2. The signal processing device of claim 1, wherein a value of the weight coefficient is determined based on an unnecessary target object that is a target object other than the wave included in the analysis area.

3. The signal processing device of claim 2, wherein the weight coefficient by which the echo intensity at each of the sampling points of the frequency area spectrum obtained from the analysis area where the unnecessary target object is included among the plurality of analysis areas is multiplied, is zero.

4. The signal processing device of claim 2, wherein the unnecessary target object is at least one of a ship, land, rain, and snow.

5. The signal processing device of claim 1, wherein the weight coefficient is determined based on the echo intensity of the wave included in each of the analysis areas.

6. The signal processing device of claim 1, wherein the processing circuitry is configured to extract a wave component resulting from the wave from the echo obtained from each of the plurality of analysis areas and carry out a frequency analysis of the wave component to generate the frequency area spectrum.

7. A signal processing device configured to process echoes of radar pulses from waves on a body of water included in a detection area, comprising:
    an antenna configured to receive echoes of radar pulses from waves included in a plurality of analysis areas set within the detection area, respectively; and
    processing circuitry configured to:
    perform a frequency analysis of the echoes received by the antenna,
    generate frequency area spectrums for the plurality of analysis areas, respectively,
    integrate echo intensity indicated by each sampling point that constitutes each of the frequency area spectrums while unifying directions included in coordinates of the frequency area spectrums, and generate an integrated frequency area spectrum,
    integrate the frequency area spectrums obtained by multiplying echo intensities at the sampling points by weight coefficients determined for the plurality of frequency area spectrums, respectively, and
    detect a physical property of the waves included in the analysis area via calculation of wave information that is information related to the physical property of the waves based on the integrated frequency area spectrum, respectively.

8. The signal processing device of claim 7, wherein a value of the weight coefficient is set based on identification of an unnecessary target object in the analysis area that is other than waves.

9. The signal processing device of claim 8, wherein a value of zero is set for a weight coefficient of an analysis area that includes the unnecessary target object.

10. The signal processing device of claim 8, wherein the unnecessary target object is at least one of a ship, land, rain, and snow.

11. The signal processing device of claim 8, wherein a weight coefficient of a particular analysis area is determined based on the echo intensity of the waves included in the particular analysis area.

12. The signal processing device of claim 7, wherein the processing circuitry is configured to
    extract a wave component resulting from echoes of radar pulses from waves from each of the plurality of analysis areas, and
    perform a frequency analysis of the wave component to generate the respective frequency area spectrums.

13. A method implemented with processing circuitry of processing echoes of radar pulses from waves on a body of water included in a detection area, the method comprising:
    receiving, with an antenna, echoes from waves included in a plurality of analysis areas set within the detection area, respectively,
    performing a frequency analysis of the echoes received by the antenna,
    generating frequency area spectrums for the plurality of analysis areas, respectively,
    integrating echo intensity indicated by each sampling point that constitutes each of the frequency area spectrums while unifying directions included in coordinates of the frequency area spectrums, and generating an integrated frequency area spectrum,
    integrating the frequency area spectrums obtained by multiplying echo intensities at the sampling points by weight coefficients determined for the plurality of frequency area spectrums, respectively, and
    detecting a physical property of the waves included in the analysis area by calculating with the processing circuitry wave information that is information related to the physical property of the waves based on the integrated frequency area spectrum, respectively.

14. A non-transitory computer storage medium having computer readable instructions stored therein that when executed by processing circuitry executes a method of processing echoes of radar pulses from waves on a body of water included in a detection area, the method comprising:
    receiving, by an antenna, echoes of radar pulses from waves included in a plurality of analysis areas set within the detection area, respectively,
    performing a frequency analysis of the echoes received by the antenna,
    generating frequency area spectrums for the plurality of analysis areas, respectively,
    integrating echo intensity indicated by each sampling point that constitutes each of the frequency area spectrums while unifying directions included in coordinates of the frequency area spectrums, and generating an integrated frequency area spectrum,
    integrating the frequency area spectrums obtained by multiplying echo intensities at the sampling points by weight coefficients determined for the plurality of frequency area spectrums, respectively, and
    detecting a physical property of the waves included in the analysis area by calculating with the processing circuitry wave information that is information related to the physical property of the waves based on the integrated frequency area spectrum, respectively.

* * * * *